Figures 1, 2:
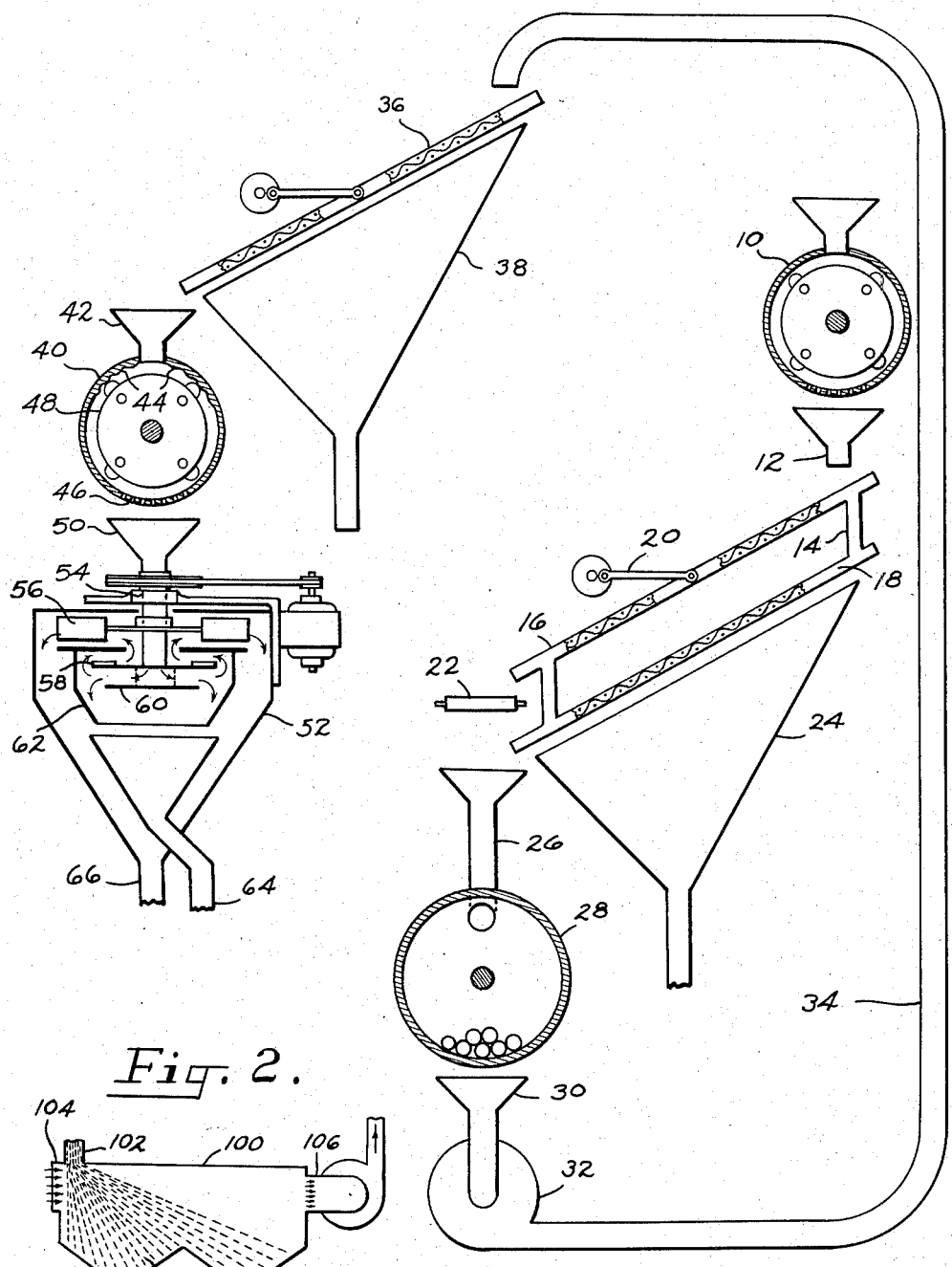

Feb. 24, 1959  C. C. HERITAGE  2,874,908
SEPARATING PURE SCLERENCYHMA FIBERS FROM DOUGLAS FIR BARK
Filed Sept. 29, 1953

INVENTOR.
Clark C. Heritage
BY

United States Patent Office 2,874,908
Patented Feb. 24, 1959

2,874,908

SEPARATING PURE SCLERENCHYMA FIBERS FROM DOUGLAS FIR BARK

Clark C. Heritage, Tacoma, Wash., assignor to Weyerhaeuser Timber Company, Tacoma, Wash., a corporation of Washington Application September 29, 1953, Serial No. 382,955

3 Claims. (Cl. 241—24)

This invention relates to a method of separating from Douglas fir bark pure sclerenchyma fibers, by which is meant sclerenchyma fibers which are substantially free from the other constituents of the bark.

Douglas fir bark consists principally of cork, parenchyma tissue and sclerenchyma or bast fibers. The cork is so called because it is a spongy, resilient, low density material resembling the cork derived from cork oak bark in appearance and in many of its properties. The parenchyma tissue is a friable phloem tissue consisting principally of sieve tubes. The sclerenchyma, which in most other species comprises the stone cells, occurs in the Douglas fir in the form of hard, fusiform needles which are generally cylindrical in cross-section and less than about ¼ inch long. For the sake of simplicity, these are termed herein simply "Douglas fir bark fibers."

The above three constituents of the bark are intimately commingled with each other and are present in varying proportions depending upon such factors as the age of the tree, climatic conditions and soil conditions. In general, the bark fibers are present in the proportion of between about 20% and about 50% by weight, based on the dry weight of the bark. A typical composite sample of Douglas fir bark for example, has the composition: Cork 24%, fiber 31%, parenchyma 45%.

Although a relatively new product on the market, Douglas fir bark fibers already have important applications. They are particularly useful in the formulation of thermosetting phenol-aldehyde molding compositions. In these the fibers may be incorporated in substantial proportions and they serve not only as an extender, materially reducing the cost of the compositions, but also as a component which imparts high flexural and tensile strengths to the molded product.

To obtain the best results from the incorporation of Douglas fir bark fibers in phenol-aldehyde molding compositions, however, it is necessary that the fibers be relatively free from the cork and the parenchyma tissue together with which they occur in the bark. The presence of the latter two components is disadvantageous since they are aldehyde reactive. Accordingly, they necessitate the increase of the amount of relatively expensive phenol-aldehyde resin which must be employed in the formulation of the molding compositions or place stringent restrictions on the formulation of the resin used. Furthermore, these materials are thermoplastic in character and thus reduce the thermosetting properties of the mixture. This leads to the formation of molded products which may have comparatively low softening temperatures. Still further, the presence of cork and parenchyma tissue in phenol-aldehyde molding compositions is disadvantageous in that these materials tend to stain and foul the molds employed in the pressing operation.

Hence it is apparent that for many important uses it is desirable, and even necessary, that the bark fibers be substantially free from cork and parenchyma tissue. The separation of a pure bark fiber fraction from Douglas fir bark is not, however, a procedure which is easy of accomplishment. This is due to several factors. As has been noted above, the fibers occur in the bark intimately mixed with the other bark constituents. They occur as individuals imbedded in a matrix of parenchyma tissue which, although friable in the mass, has the property of adhering very tightly as a thin coating on the surfaces of the fibers. Moreover, a certain proportion of the fibers is occluded within the cork platelets. Consequently the reduction of bark to the form of small pieces to effect the release of occluded material is required as a preliminary step to its fractionation for the quantitative recovery of a fiber product.

However, a mere reduction in particle size does not permit a clean cut separation of the fibers from the other bark constituents. Rather, it results in the formation of a complex mixture comprising not only clean cork particles, unencrusted fibers and powdered parenchyma tissue, but also aggregates of cork with the other constituents of the bark, and sclerenchyma fibers encrusted with a tightly adhering coating of parenchyma tissue. This coating is clearly visible upon microscopic examination of the powdered bark, the fibers appearing as white or light colored translucent, elongated sharp ended bodies covered with a crust of dark colored, amorphous appearing parenchyma tissue.

Removal of the parenchyma sheaths from the fibers is difficult at best and is particularly difficult, if not impossible, by the usual abrading, scouring, or grinding methods if performed in the presence of the cork particles. These spongy, resilient bodies interfere with and markedly reduce the effectiveness of the abrading or grinding operation, by serving as buffers which cushion the impact of the fibers with each other or with the abrading means and thereby prevent the removal of the parenchyma sheaths from the fibers.

Another difficulty inherent in any procedure for separating the fiber component from comminuted Douglas fir bark resides in the fact that the particles of cork and the fibers have overlapping sizes so that a single screening procedure is not successful in fractionating the particles quantitatively. Rather, a carefully coordinated series of operations for reducing the bark to the form of small pieces and then by removing stepwise the various bark fractions with intermediate treating steps is required. This sequence of operations is the subject matter of the present invention.

The presently described procedure for the separation of pure sclerenchyma fibers from Douglas fir bark broadly comprises grinding bark having a moisture content of less than about 30% by weight to form a mixture of particles having maximum cross-sectional dimensions of less than about ½ inch. As has been noted above, this mixture is complex in character and comprises principally cork particles, aggregates of cork with the other constituents of the bark, parenchyma particles, and sclerenchyma fibers, most of which are encrusted with tightly adherent sheaths of parenchyma tissue.

The foregoing mixture is processed for removal of at least a major proportion of its cork content. The substantially cork-free material then is abraded for removal of the sheaths encrusting the fibers. This forms a mixture consisting principally of bark fibers and powdered parenchyma tissue together with a minor proportion of cork particles. The mixture is entrained in a gaseous stream, preferably an air stream, and fractionated in an air separator, which, taking advantage of the higher density of the fibers and the higher air resistance of the parenchyma and cork, effectuates a relatively complete separation of the fibers from the mixture.

As has been indicated above, the method of this invention is applicable particularly to the bark of the Douglas fir since in this species the sclerenchyma tissue is found in the form of the needle shaped fibers which have been described. In carrying it out, the moisture content of the bark first is adjusted to a value of less than about 30% by weight, the preferred range being between about 5% and about 15% by weight, with or without a preliminary comminution of the bark. Such an adjustment makes possible an effective grinding operation and subsequent separation of the fibers from the remainder of the bark. It may be accomplished in any suitable manner, as by means of ovens, dry kilns, or by air drying methods.

Referring now to the drawings wherein:

Figure 1 is a flow plan illustrating diagrammatically the operations whereby sclerenchyma fibers may be separated from Douglas fir bark; and Figure 2 is a schematic view in side elevation of an alternate type of separator which may be employed in the operations illustrated in Figure 1.

The dried bark is reduced in size in a suitable mill which may be a ballmill, a rodmill, a hammermill, a Kollergang, etc. Preferably, however, the bark is reduced in a hammermill such as is illustrated at 10 in the drawings. This apparatus is fitted in the usual manner with a screen dimensioned to pass particles having a maximum dimension of less than about ½ inch, preferably less than about ¼ inch. It causes the reduction to the form of powder of most of the friable parenchyma tissue, the release of a substantial proportion of the cork in the form of cork platelets and of small aggregates of cork with the other constituents of the bark, and the liberation of a substantial proportion of the sclerenchyma fibers as individual fibers, most of which are encrusted with tightly adherent coatings of parenchyma tissue.

The ground product is collected in any suitable type of receiver, as for example, in hopper 12. It then is passed to means for separating a major proportion of the cork from the other constituents of the mixture. As has been noted above, this is in order to enable abrading the fibers for the removal of the encrusting parenchyma sheaths, an operation which is impossible or at least very difficult as long as the mixture contains a substantial amount of cork.

In the form illustrated in Figure 1, the means employed for the selective separation of the cork comprises a system of superimposed vibrating foraminous members or screens indicated generally at 14. The upper screen 16 has a mesh opening width of between about 0.01 inch and about 0.05 inch preferably from about 0.02 to 0.03 inch while the lower screen 18 has a mesh opening width of between about 0.006 inch and about 0.012 inch preferably from about 0.008 to 0.009 inch. The two screens are mounted in suitable guides, not illustrated, and vibrated through crank 20.

The openings of screen 16 are dimensioned to retain the cork particles and the relatively large aggregates of cork with the other bark constituents. These gravitate downwardly along the screen and are collected as a separate fraction on conveyor belt 22.

The powdered parenchyma tissue and the sclerenchyma fibers together with a relatively minor proportion of cork particles and cork-containing aggregates pass through screen 16 and fall on screen 18. The openings of this screen are dimensioned to pass principally the powdered parenchyma tissue which is collected as a separate fraction in hopper 24. The fibers, together with a small proportion of cork particles and cork aggregates, pass downwardly along screen 18 and are collected as a third fraction which then is subjected to further processing for removal of the parenchyma sheaths from the fibers.

As a step preliminary to such removal, the fiber fraction may be subjected to a second milling operation having for its purpose the separation of a further quantity of the powdered parenchyma tissue and the smaller cork particles. Thus it may be directed via conduit 26 into a ballmill 28 or similar mill where it is further abraded under conditions which result in a minimum size reduction of the individual fibers. The product then is collected in a hopper 30 and conveyed, gravitationally, or by means of a blower system including fan 32 and conduit 34, to a foraminous member which in the illustrated form comprises the vibrating screen 36.

Screen 36 has a mesh opening size of between about 0.006 and about 0.012 inch, preferably of between about 0.008 and 0.009 inch which passes the powdered parenchyma tissue and some of the smaller cork particles. These are collected as a separate fraction in hopper 38. The fraction containing principally the bark fibers, still encrusted with their parenchyma sheaths, but relatively free from cork and loose parenchyma, passes from the top of the screen 36 into abrading or grinding means selected to scour off the parenchyma sheaths without simultaneously pulverizing the bark fibers.

The abrading apparatus employed preferably comprises the modified hammermill 40. This device is fed through hopper 42 and is provided with a breaker plate 44 and a screen 46 having a mesh opening size of between about ¼ inch and about ½ inch. The hammer member 48 is dimensioned to rub and abrade the charge against the breaker plate 44, the reduced material then passing through screen 46. The mill accomplishes the removal of the parenchyma tissue from the fiber needles so that as a product there are obtained the parenchyma-free needles, the powdered parenchyma tissue and a minor quantity of small cork particles.

As has already been noted, fractionation of the foregoing product to isolate the fibers as a separate and distinct fraction is difficult because of the overlapping sizes and weights of the component particles. Accordingly, a simple screening procedure may not be employed such as is used conventionally in the separation of many solid mixtures. It now has been discovered, however, than an effective separation of the bark fibers may be accomplished by taking advantage of the different air resistance properties of the bark components.

Accordingly, the bark fibers may be separated from the comminuted mixture in which they are contained by entraining the mixture in an air or other gaseous stream and centrifuging or winnowing it for separating the fibers as a separate fraction. In a preferred procedure the mixture passed by hammermill 40 is collected in a hopper 50, and directed into a type of centrifuge 52 commonly known as a whizzer or Raymond air separator. This device separates solid particles by subjecting them to centrifugal force combined with a self-generated updraft. This construction and mode of operation are described in detail in U. S. Patent Re. 20,543 to Crites.

As is illustrated schematically in Figure 1, the comminuted fiber fraction is introduced into the separator through the bore of rotatably mounted, hollow shaft 54. This shaft is motor driven and carries a fan 56, a bladed wheel 58 and a distributor plate 60, the two latter being housed within an inner shell 62.

Fan 56, bladed wheel 58 and distributing plate 60 are rigid to shaft 54 and rotate therewith. During rotation of the fan, air currents are set up along the path illustrated by the arrows. Accordingly, the fiber fraction introduced through the bore of the shaft first strikes distributor plate 60 and then is scattered and blown upwardly through the blades of wheel 58. The blades exert a centrifugal action upon the particles, casting them outwardly in proportion to their weight and air resistance. The heavier fiber particles are thrown against the inside surface of shell 62 and pass out of the apparatus via conduit 64. The lighter particles, however, are not so subject to centrifugal action and are carried by the air currents into the outer chamber where they settle to the bottom of the apparatus. They are educted therefrom via conduit 66, where they may be collected as a separate fraction. The fiber fraction thus obtained represents about 15% of the original weight of the dry bark, which in turn contained about 30% fiber. It is obtained in the form of small translucent needles, pointed at both ends and on the average about 1/8 inch long. The fraction analyzes about 90% pure fiber and is applicable to advantage in the several uses to which pure Douglas fir bark fiber may be put.

An alternative air separator for separating the bark fibers from the mixture emanating from mill 40 of Figure 1 is illustrated in Figure 2. This comprises a winnower 100 which, like the air separator 52 of Figure 1, takes advantage of the differential densities and air resistance of the fibers, the parenchyma powder and the cork particles.

In this device, the finely divided feed material introduced in dispersed form through conduit 102 is entrained in an air stream entering through port 104 and exhausted through port 106. At the bottom of the winnowing chamber there are at least two hoppers, one of these being indicated at 108 and the other at 110.

The solid material entrained in the air stream will fall downwardly within the apparatus in proportion to its density and air resistance, the heavier fraction comprising the bark fibers collecting in hopper 108 and the lighter fraction comprising principally the powdered parenchyma collecting in hopper 110. The powdered parenchyma fraction then may be withdrawn from the device through conduit 114 and the fiber fraction through conduit 116. The latter fraction thus is obtained as a relatively pure product such as is obtained from the air separator 52 of Figure 1.

The method of the present invention is illustrated by the following example.

Example 1000 pounds dry bark basis of Douglas fir bark having a moisture content of about 10% was milled in a hammermill to pass an 8 mesh screen. The material was placed on a double deck vibrating screen, the top screen of which had a mesh opening size of 0.02 inch and the bottom of 0.008 inch.

The cork fraction retained on the top screen was collected separately. It weighed 372 pounds. The parenchyma powder fraction passed by both screens was collected as a separate fraction. It weighed 217 pounds. The fiber fraction retained on the second screen weighed 411 pounds. It was passed to a ballmill and reduced to such particle size that less than 0.5% was retained on a 28 mesh Tyler screen, after which the ground product was screened on a vibrating screen having mesh openings of 0.008 inch. The material passing the screen weighed 179 pounds and was not further processed. The fiber fraction retained on the screen weighed 232 pounds and was passed into a modified hammermill fitted with a breaker plate at the top and a 3/8 inch mesh opening screen at the bottom.

The material passing the screen of the hammermill then was introduced into a Raymond air separator and divided into two fractions. The light fraction (66 pounds) consisted of both cork particles and powdered parenchyma, while the heavy fraction (166 pounds) consisted of bark fibers analyzing about 90% fiber and substantially free from encrusting parenchyma tissue. This accounts for approximately 50% of the bast fibers present in the original whole bark. The remainder appears primarily in the cork and fines fractions. Hence the overall pure fiber yield may be increased substantially by processing these fractions.

It is to be understood that the form of my invention herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. The method of separating from Douglas fir bark sclerenchyma fibers which are substantially free from the other constituents of the bark which comprises reducing bark having a moisture content of less than 30% by weight to a mixture of particles having maximum cross-sectional dimensions of less than 1/2 inch, the mixture comprising cork particles, cork-containing aggregates, parenchyma particles and sclerenchyma fibers encrusted with tightly adherent sheaths of parenchyma tissue, selectively removing a substantial proportion of the cork particles and cork-containing aggregates from the mixture, milling the resulting fiber-rich mixture for separating further the parenchyma tissue and the cork particles, screening the milled product for separation of a concentrated fiber fraction (retained) from further quantities of powdered parenchyma and small cork particles (passed), abrading the concentrated fiber fraction for removing the parenchyma encrustations from the fibers, entraining the abraded material in a gaseous stream, and selectively separating the sclerenchyma fibers therefrom.

2. The method of separating from Douglas fir bark sclerenchyma fibers which are substantially free from the other constituents of the bark which comprises reducing bark having a moisture content of less than 30% by weight to a mixture of particles having maximum cross-sectional dimensions of less than 1/2 inch, the mixture comprising cork particles, cork containing aggregates, parenchyma particles and sclerenchyma fibers encrusted with tightly adherent sheaths of parenchyma tissue, selectively removing a substantial proportion of the cork particles and cork-containing aggregates from the mixture, milling the resulting fiber-rich mixture for separating further the parenchyma tissue and the cork particles, screening the milled product on a screen having a mesh opening size of between 0.006 and 0.012 inch for separation of a concentrated fiber fraction (retained) from further quantities of powdered parenchyma and small cork particles (passed), abrading the concentrated fiber fraction for removing the parenchyma encrustations from the fibers, entraining the abraded material in a gaseous stream, and selectively separating the sclerenchyma fibers therefrom.

3. The method of separating from Douglas fir bark sclerenchyma fibers which are substantially free from other constituents of the bark which comprises reducing the bark to a mixture of particles having maximum cross-sectional dimensions of less than 1/2", the mixture comprising cork particles, cork-containing aggregates, parenchyma particles, and sclerenchyma fibers encrusted with tightly adherent sheaths of parenchyma tissue, selectively removing a substantial proportion of the cork particles and cork-containing aggregates from the mixture, milling the resulting fiber-rich mixture for separating further the parenchyma tissue and the cork particles screening the milled product for separation of a concentrated fiber fraction (retained) from further quantities of powdered parenchyma and small cork particles (passed), abrading the concentrated fiber fraction for removing the parenchyma encrustations from the fibers, entraining the abraded material in a gaseous stream, and selectively separating the sclerenchyma fibers therefrom, the mixture containing the original bark components being adjusted to a moisture content of less than 30% by weight prior to the separation of the cork particles and cork-containing aggregates from the mixture.

References Cited in the file of this patent

UNITED STATES PATENTS

| | | |
|---|---|---|
| 1,455,762 | Howard | May 15, 1923 |
| 2,437,672 | Anway | Mar. 16, 1948 |
| 2,446,551 | Pauley | Aug. 10, 1948 |
| 2,627,375 | Grondal et al. | Feb. 3, 1953 |